J. Bush,
7789X
Cutting Shingles.
Patented Nov. 19, 1833.
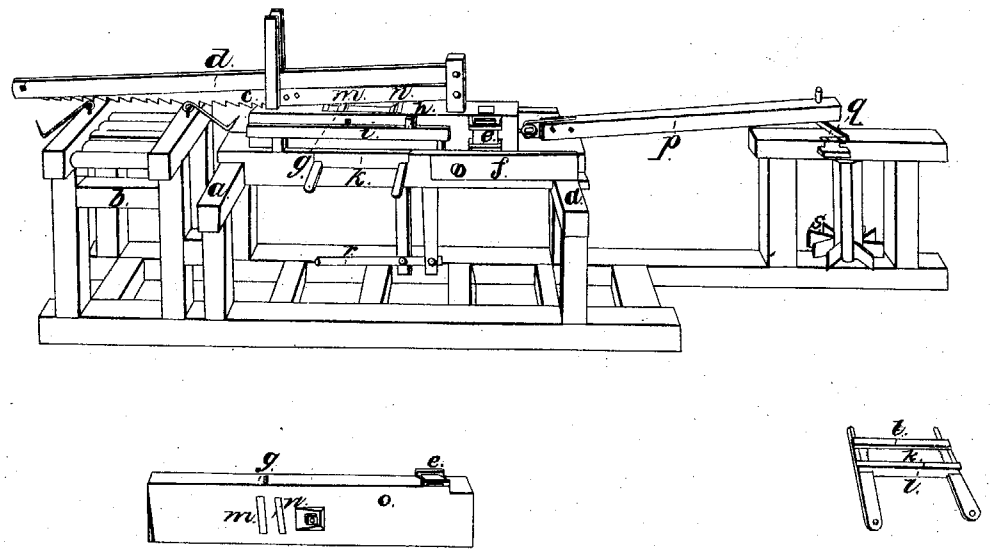
AM. PHOTO-LITHO. CO. N.Y. (OSBORNE'S PROCESS)

7784X Nov 19 1833 495

John Bush Dayton Indiana

Letters Patent

The schedule referred to in these Letters Patent and making part of the same con-
-taining a description in the words of the said John Bush himself of his improve-
-ment in the machine for making Shingles Be it known that I John Bush of Dayton Tippecanoe County State of Indiana
have made an improvement in the useful arts being a machine for sawing the
blocks or bolts and riving, jointing and dressing the Shingles call'd the Bush's
Shingle Machine, which is described as follows reference being had to the an-
-nexed drawings making part of this specification
This machine consists of the following principal parts
the frame for containing and supporting the different parts of the machinery
the frame & rollers upon which the timber is placed to be cut into blocks or bolts the
saw with which it is cut the apparatus with which it is rived or split into
Shingles the jointing plane with the rest and guides the hand carriage upon
which the Shingles are placed; planes and carriage for dressing or shaving the
Shingles the lever for raising the planes and crank on the water wheel shaft
for giving motion to the different parts of the machinery
The frame is to be constructed of suitable timber and is adapted by
its size form & strength to receive and support the several parts of the machinery
to be applied in making Shingles. That part of the frame marked L upon which
the timber is placed upon rollers is erected at one end of the machine.
A [illegible] c placed in a frame a & given a [illegible]
[illegible] working on a bolt is attached to the planing apparatus and works
[illegible] of the frame upon which the timber is laid and held down by dogs
and cuts it into blocks or bolts for Shingles by the motion of the carriage
A Knife or Chisel e for riving or splitting the blocks or bolts into
Shingles is fixed on the side of the plane carriage and a rest f is fastened
on the carriage upon which the bolt is placed to be rived
A jointing plane g is also affixed on the side of the plane car-
-riage

7789X

[illegible] with a [illegible] to [illegible] upon which the Shingles to be jointed are placed of plane Carriage & having the handles to [illegible] and teeth or bars against which the Shingles are held is made to slide in an opening in the frame and under the plane Carriage upon rollers the side pieces C of this Carriage be

[illegible] which the Shingle rests is an inclined plane which cause the shingles to be cut thinner at the fore and thicker at the hind end forming the point and butt of the Shingles by the planes cutting off more at the point than at the butt Two plane irons [illegible] one before the other are fixed in the plane Carriage the front plane iron by wedges and the [illegible] plane iron by a bolt & screw. The plane carriage is attached to a [illegible] worked by a crank g which causes it to move forward & backward upon ways placed on the frame.

Below the plane Carriage & attached to the underside of it is a lever or rocking [illegible] in a post or Standard [illegible] for raising the plane Carriage when required to insert the hand carriage with the Shingle.

The whole Machinery is adapted to work each part separately or all together as suits the operator Operation The machinery being put in motion by the water wheel or [illegible] shaft [illegible] by the power of Steam horses or otherwise, the timber to be cut into blocks or bolts is placed upon the rollers on the frame at the end of the machine and secured by the dogs so as to cut a proper length the saw is then brought down upon the log which is cut out into blocks or bolts for Shingles these bolts are next removed to the splitting or riving knife to be [illegible] into shingles by the action of the [illegible] to the plane carriage as before The shingles are then jointed by being placed on the rail and held in contact with the jointing plane on the side of the Carriage frame one side at a time and changed. The shingles are then placed on the hand frame and secured by the bars and the hand frame with the Shingle slides under the plane frame and then shaved by the planes the point & butt being formed by the motion of the plane frame upon the inclined plane formed on the hand frame When the planing ceases the plane frame is raised by the lever & [illegible] placed under the frame and the Shingle turned over the plane frame let down, and the other side of the Shingle shaved, one or both plane irons may be used as thought best.

9784x

The invention here claimed is not deemed by Examiner Patent Office of the peculiar arrangement & combination of the several parts of the Improved machine for making shingles Canal at the City of Washington this 8 day of October 1839

Wilkins
N P Ellis
Jno H Walker

D. Ulm Brook
(Or in Portfolio)

975 & 75